(12) United States Patent
Fukui

(10) Patent No.: US 9,077,905 B2
(45) Date of Patent: Jul. 7, 2015

(54) IMAGE CAPTURING APPARATUS AND CONTROL METHOD THEREOF

(75) Inventor: Takaaki Fukui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 12/694,066

(22) Filed: Jan. 26, 2010

(65) Prior Publication Data

US 2010/0201843 A1    Aug. 12, 2010

(30) Foreign Application Priority Data

Feb. 6, 2009    (JP) ................................. 2009-026694
Feb. 6, 2009    (JP) ................................. 2009-026695

(51) Int. Cl.
*H04N 5/235* (2006.01)
*H04N 5/232* (2006.01)

(52) U.S. Cl.
CPC ........... *H04N 5/235* (2013.01); *H04N 5/23219* (2013.01); *H04N 5/2355* (2013.01)

(58) Field of Classification Search
USPC .............................................. 348/221.1, 362
See application file for complete search history.

(56) References Cited

U.S. PATENT DOCUMENTS

| | | | |
|---|---|---|---|
| 4,748,677 A | | 5/1988 | Yokomizo |
| 7,268,807 B2 * | | 9/2007 | Nakamura et al. ......... 348/229.1 |
| 7,646,407 B2 * | | 1/2010 | Fossum et al. ............ 348/229.1 |
| 7,782,366 B2 | | 8/2010 | Imai |
| 8,120,667 B2 | | 2/2012 | Mizuno et al. |
| 2001/0013903 A1* | | 8/2001 | Suzuki et al. ................ 348/362 |
| 2003/0011790 A1 | | 1/2003 | Schulte et al. |
| 2003/0174216 A1* | | 9/2003 | Iguchi et al. .............. 348/223.1 |
| 2005/0012848 A1 | | 1/2005 | Hayaishi |
| 2005/0185223 A1 | | 8/2005 | Takahashi et al. |
| 2005/0275737 A1* | | 12/2005 | Cheng ....................... 348/333.02 |
| 2007/0081721 A1 | | 4/2007 | Xiao et al. |
| 2007/0103706 A1 | | 5/2007 | Bing et al. |

(Continued)

FOREIGN PATENT DOCUMENTS

| | | |
|---|---|---|
| CN | 1450789 A | 10/2003 |
| CN | 101176338 A | 5/2005 |

(Continued)

OTHER PUBLICATIONS

Konstantin Tovstiadi, Best quality pictures with the Olympus e-510: Part III-ISO, posted by Konstantin Tovstiadi Friday, Oct. 26, 2007 (XP-002580890) 5 pages, Retrieved from the internet: URL:http://kt.mikt.net/serendipiity/index.php?/archives/63-Best-quality-pictures-with-the-Olympus-e-510-Part-III-ISO.html.

The references were cited in a Jul. 30, 2010 European Search Report in European Application No. 10151796.9, a copy of which is not enclosed.

The above references were cited in a Dec. 7, 2011 Chinese Office Action, a copy of which is enclosed with an English Translation, that issued in Chinese Patent Application No. 201010112187.6.
Related to U.S. Appl. No. 12/694,111.

(Continued)

*Primary Examiner* — Anthony J Daniels
(74) *Attorney, Agent, or Firm* — Cowan, Liebowitz & Latman, P.C.

(57) ABSTRACT

An image capturing apparatus and a control method capable of obtaining an image with a wide dynamic range, without using a special image sensor. An amount of dynamic range enhancement for lessening an amount of blown-out highlights of an image is determined based on the amount of blown-out highlights. An image with enhanced dynamic range is then obtained, by performing image capture at a sensitivity that has been lessened based on the amount of dynamic range enhancement, and correcting a drop in brightness of the captured image due to the lessened sensitivity.

13 Claims, 12 Drawing Sheets

(56) References Cited

U.S. PATENT DOCUMENTS

| | | |
|---|---|---|
| 2007/0115369 A1 | 5/2007 | Utagawa |
| 2007/0263097 A1 | 11/2007 | Zhao et al. |
| 2007/0291152 A1* | 12/2007 | Suekane et al. .......... 348/333.02 |
| 2008/0187235 A1 | 8/2008 | Wakazono et al. |
| 2008/0211923 A1 | 9/2008 | Watanabe |
| 2008/0231730 A1 | 9/2008 | Tsuruoka |
| 2008/0240605 A1 | 10/2008 | Enjuji |
| 2009/0002514 A1* | 1/2009 | Steinberg et al. .......... 348/222.1 |
| 2009/0167751 A1 | 7/2009 | Kerofsky |
| 2009/0174808 A1 | 7/2009 | Mochida et al. |
| 2009/0303345 A1 | 12/2009 | Deguchi et al. |
| 2010/0123805 A1 | 5/2010 | Craig et al. |
| 2010/0157112 A1 | 6/2010 | Miyagi |
| 2010/0194931 A1 | 8/2010 | Kawaguchi et al. |
| 2010/0220223 A1 | 9/2010 | Tsuruoka |
| 2010/0255766 A1 | 10/2010 | Nolsoe |
| 2011/0170775 A1 | 7/2011 | Manabe |
| 2011/0255766 A1 | 10/2011 | Heath et al. |

FOREIGN PATENT DOCUMENTS

| | | |
|---|---|---|
| CN | 1697478 A | 11/2005 |
| CN | 101312504 A | 11/2008 |
| EP | 1014687 A2 | 6/2000 |
| EP | 1761040 A | 3/2007 |
| GB | 2442257 A | 4/2008 |
| JP | 63-202187 A | 8/1988 |
| JP | 05-158103 A | 6/1993 |
| JP | 2002-251380 A | 9/2002 |
| JP | 2003-008986 A | 1/2003 |
| JP | 2004166196 A | 6/2004 |
| JP | 2004-186876 A | 7/2004 |
| JP | 2005-130484 A | 5/2005 |
| JP | 2005-209012 A | 8/2005 |
| JP | 2006-165725 A | 6/2006 |
| JP | 2007-324856 A | 12/2007 |
| JP | 2008-054293 A | 3/2008 |
| JP | 2008-085581 A | 4/2008 |
| JP | 2008-131530 A | 6/2008 |
| JP | 2009-008961 A | 1/2009 |
| JP | 2009-017229 A | 1/2009 |
| WO | 2009013850 A1 | 1/2009 |

OTHER PUBLICATIONS

The above foreign patent documents were cited in a Jan. 5, 2012 Japanese Office Action, a copy of which is enclosed without an English Translation, that issued in Japanese Patent Application No. 2009-034392.

The above foreign patent documents were cited in a Feb. 18, 2011 Japanese Office Action, a copy of which is enclosed without an English Translation, that issued in Japanese Patent Application No. 2009-034392.

The above references were cited in a May 23, 2012 US Notice of Allowance that issued in related U.S. Appl. No. 12/694,111, a copy of which is enclosed.

The above references were cited in a Jan. 8, 2013 Japanese Office Action, a copy of which is enclosed without English Translation, that issued in Japanese Patent Application No. 2009-026694 and 2009-026695.

The above references were cited in a Feb. 21, 2013 US Notice of Allowance that issued in related U.S. Appl. No. 13/592,868, a copy of which is enclosed.

These references were cited in an Jan. 6, 2014 U.S. Office Action, a copy of which is not enclosed, that issued in related U.S. Appl. No. 13/592,868.

The above foreign reference 2 was cited in a Apr. 11, 2014 Japanese Decision to Dismiss the Amendment, a copy of which is enclosed without an English Translation, that issued in Japanese Patent Application No. 2006-026694.

The above foreign reference 1 was cited in a Apr. 11, 2014 Japanese Decision to Dismiss the Amendment, a copy of which is enclosed without an English Translation, that issued in Japanese Patent Application No. 2006-026695.

The above references were cited in a Jan. 20, 2014 in the Search Report concerning European Patent Application No. 13168007.6, which is a counterpart application of the related U.S. Appl. No. 13/592,868.

The above patent documents were cited in a Jul. 31, 2014 Office Action, a copy of which is not enclosed, that issued in related U.S. Appl. No. 13/592,868.

The above foreign patent documents were cited in the Apr. 20, 2015 Japanese Office Action, a copy of which is enclosed without an English Translation, that issued in Japanese Patent Application No. 2014-143627.

* cited by examiner

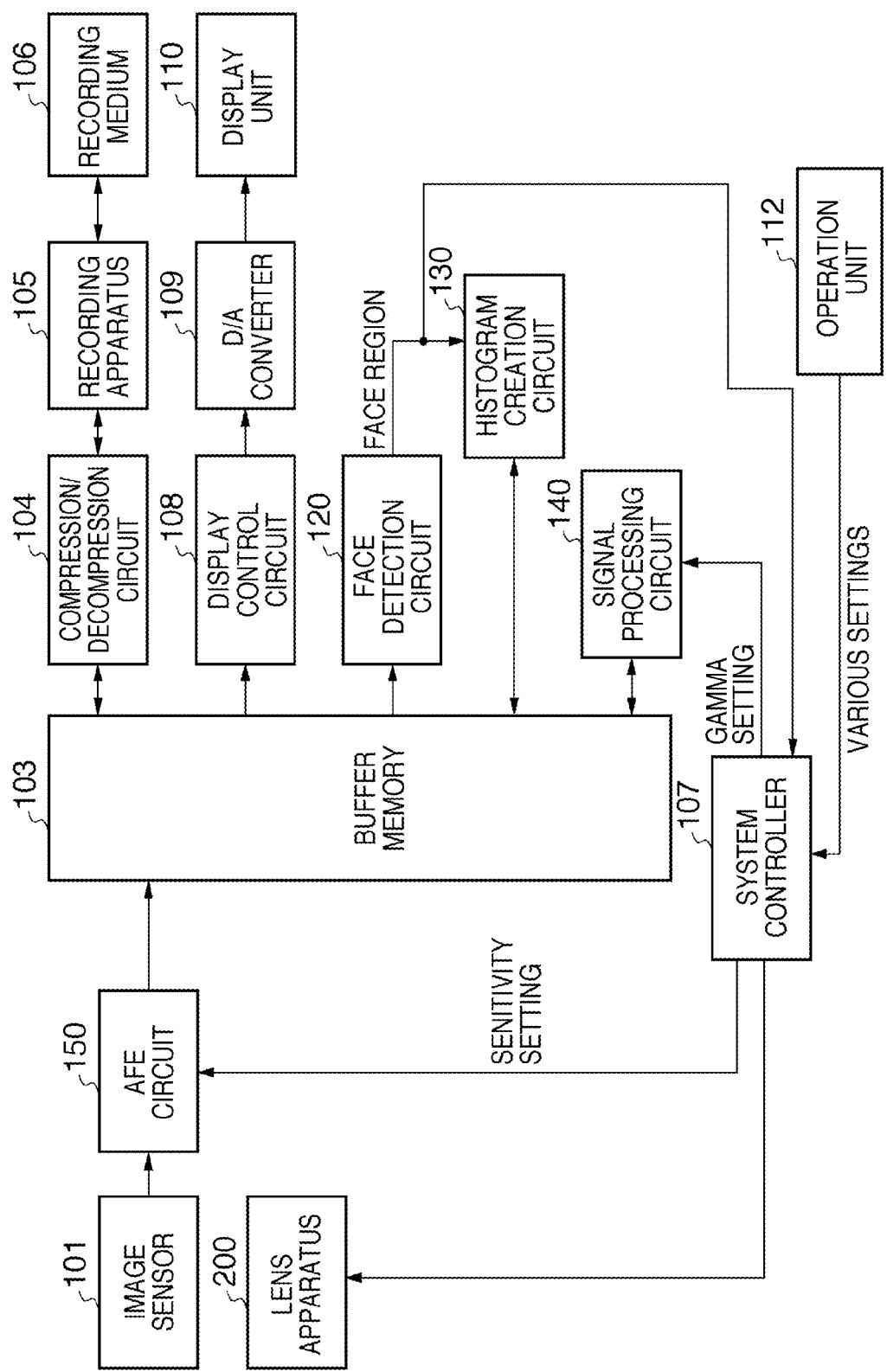

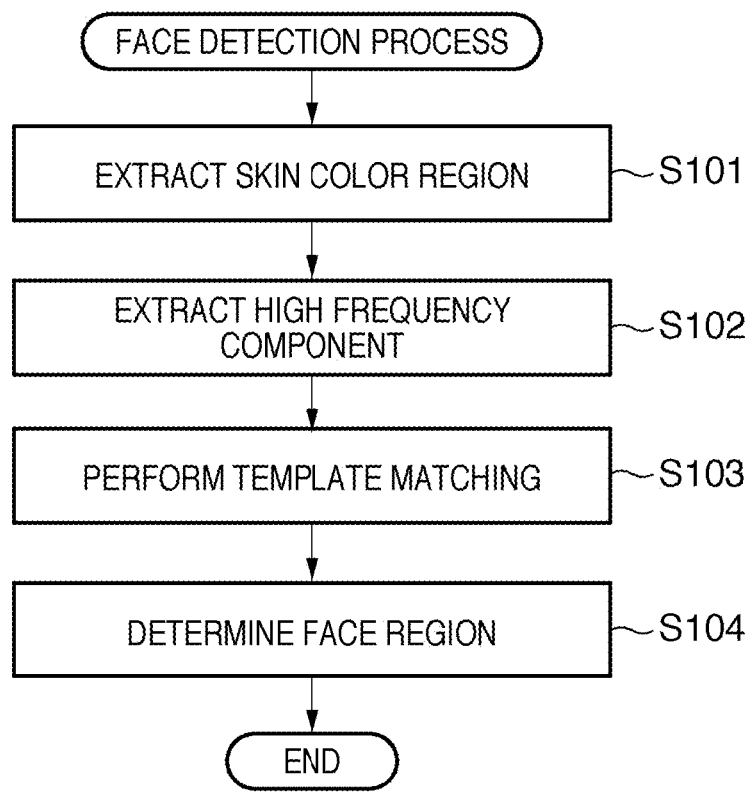

FIG. 9A

| AUTO | BACKGROUND | | | |
|---|---|---|---|---|
| | 0/3 STEPS | 1/3 STEPS | 2/3 STEPS | 3/3 STEPS |
| FACE | 0/3 STEPS | 0 | 1/3 STEPS | 2/3 STEPS | 3/3 STEPS |
| | 1/3 STEPS | 1/3 STEPS | 1/3 STEPS | 2/3 STEPS | 3/3 STEPS |
| | 2/3 STEPS | 2/3 STEPS | 2/3 STEPS | 2/3 STEPS | 3/3 STEPS |
| | 3/3 STEPS | 3/3 STEPS | 3/3 STEPS | 3/3 STEPS | 3/3 STEPS |

FIG. 9B

| LANDSCAPE MODE | BACKGROUND | | | |
|---|---|---|---|---|
| | 0/3 STEPS | 1/3 STEPS | 2/3 STEPS | 3/3 STEPS |
| FACE | 0/3 STEPS | 0 | 1/3 STEPS | 2/3 STEPS | 3/3 STEPS |
| | 1/3 STEPS | 0 | 1/3 STEPS | 2/3 STEPS | 3/3 STEPS |
| | 2/3 STEPS | 1/3 STEPS | 1/3 STEPS | 2/3 STEPS | 3/3 STEPS |
| | 3/3 STEPS | 2/3 STEPS | 2/3 STEPS | 2/3 STEPS | 3/3 STEPS |

FIG. 9C

| PORTRAIT MODE | BACKGROUND | | | |
|---|---|---|---|---|
| | 0/3 STEPS | 1/3 STEPS | 2/3 STEPS | 3/3 STEPS |
| FACE | 0/3 STEPS | 0 | 0 | 1/3 STEPS | 2/3 STEPS |
| | 1/3 STEPS | 1/3 STEPS | 1/3 STEPS | 1/3 STEPS | 2/3 STEPS |
| | 2/3 STEPS | 2/3 STEPS | 2/3 STEPS | 2/3 STEPS | 2/3 STEPS |
| | 3/3 STEPS | 3/3 STEPS | 3/3 STEPS | 3/3 STEPS | 3/3 STEPS |

|  | AE TARGET VALUE | SATURATION SIGNAL AMOUNT LUMINANCE | DYNAMIC RANGE |
|---|---|---|---|
| 0/3 STEPS | 130 | 1024 | 7.9 |
| 1/3 STEPS | 103 | 1024 | 9.9 |
| 2/3 STEPS | 82 | 1024 | 12.5 |
| 3/3 STEPS | 65 | 1024 | 15.8 |

ENLARGED VIEW

IMAGE CAPTURING APPARATUS AND CONTROL METHOD THEREOF

BACKGROUND OF THE INVENTION

1. Field of the Invention

The present invention relates to an image capturing apparatus and a control method thereof.

2. Description of the Related Art

Heretofore, digital still cameras and digital video cameras using an image sensor such as a CCD image sensor or a CMOS image sensor have been widely used. However, the dynamic range (latitude) of these image sensors is narrow compared with silver halide film. For this reason, when capturing a high contrast scene, loss of tone detail in low luminance portions (plugged-up shadows) and loss of tone detail in high luminance portions (blown-out highlights) readily occur.

Systems capable of controlling the dynamic range automatically have been proposed in response to such problems.

For example, in Japanese Patent Laid-Open No. 2005-209012, it is proposed, in the case where it is detected from a captured image that the main subject is backlit or in a high contrast scene, to specify a black saturation point and a white saturation point from a histogram of the image, and perform tone correction such that the brightness of the main subject is appropriate.

Also, in Japanese Patent Laid-Open No. 2004-186876, it is proposed to acquire two types of images with different dynamic ranges using an image sensor disposed with high sensitivity light receiving elements and low sensitivity light receiving elements, by capturing the same scene with the light receiving elements having different sensitivities, and combine these captured images according to a scene analysis result.

However, with the method of Japanese Patent Laid-Open No. 2005-209012, an effect of widening the dynamic range is not obtained, since the points at which the sensor becomes saturated do not change, despite there being an effect of increasing contrast to the eye.

Also, with the method of Japanese Patent Laid-Open No. 2004-186876, an effect of widening the dynamic range is obtained, but there is the problem of the cost involved, since a special image sensor disposed with light receiving elements having different sensitivities needs to be used.

SUMMARY OF THE INVENTION

The present invention has been made in consideration of such problems with the conventional art, and provides an image capturing apparatus and a control method thereof that are capable of obtaining an image with a wide dynamic range, without using a special image sensor.

According to an aspect of the present invention, there is provided an image capturing apparatus comprising: a computing unit which computes, from an image captured using an image sensor, an amount of blown-out highlights of the image; an enhancement amount determining unit which determines, based on a magnitude of the amount of blown-out highlights, an amount of dynamic range enhancement for lessening the amount of blown-out highlights; a correction amount determining unit which determines a lessening amount of ISO speed that depends on the amount of dynamic range enhancement, and a correction amount for correcting a brightness of an image captured at the lessened ISO speed; a control unit which performs image capture using the image sensor, at the ISO speed determined by the correction amount determining means; and a correcting unit which corrects the brightness of an image captured by the control means, in accordance with the correction amount.

According to another aspect of the present invention, there is provided a control method of an image capturing apparatus comprising: a computing step of computing, from an image captured using an image sensor, an amount of blown-out highlights of the image; an enhancement amount determining step of determining, based on a magnitude of the amount of blown-out highlights, an amount of dynamic range enhancement for lessening the amount of blown-out highlights; a correction amount determining step of determining a lessening amount of ISO speed that depends on the amount of dynamic range enhancement, and a correction amount for correcting a brightness of an image captured at the lessened ISO speed; a control step of performing image capture using the image sensor, at the ISO speed determined in the correction amount determining step; and a correcting step of correcting the brightness of an image captured in the control step, in accordance with the correction amount.

Further features of the present invention will become apparent from the following description of exemplary embodiments with reference to the attached drawings.

BRIEF DESCRIPTION OF THE DRAWINGS

FIG. 1 is a block diagram showing an example configuration of an image capturing apparatus according to an embodiment of the present invention.

FIG. 3A is a flowchart illustrating a face detection operation in a face detection circuit of the image capturing apparatus according to the embodiment of the present invention.

FIG. 3B shows example coefficients of a two-dimensional high-pass filter used by the face detection circuit of the image capturing apparatus according to the embodiment of the present invention.

FIGS. 9A to 9C show specific examples of final amounts of D-range enhancement determined according to the magnitude of an amount of D-range enhancement for a face region and an amount of D-range enhancement amount for an entire image, in the image capturing apparatus according to the embodiment of the present invention.

DESCRIPTION OF THE EMBODIMENTS

Figure 2A:
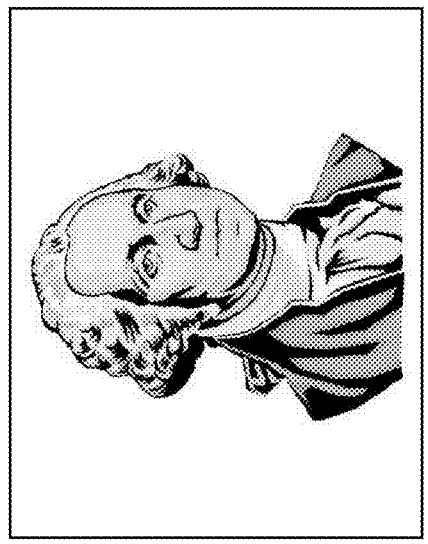
FIGS. 2A to 2D schematically show the process of detecting a face from an original image.

Preferred embodiments of the present invention will now be described in detail in accordance with the accompanying drawings.

FIG. 1 is a block diagram showing an example configuration of an image capturing apparatus according to an embodiment of the present invention. The image capturing apparatus of the present embodiment encompasses arbitrary apparatuses having a function of capturing images using an image sensor. Such apparatuses include mobile telephones, PDAs and personal computers that incorporate or are connected to a camera, as well as digital still cameras and digital video cameras.

In FIG. 1, an operation unit 112 includes buttons, switches or the like, and is used by a user for giving instructions and configuring settings with respect to the image capturing apparatus. The operation unit 112 also includes a shutter button, and, in the present embodiment, is able to detect a half stoke state and a full stroke state of the shutter button.

A system controller 107 perceives a half stroke state of the shutter button as an image capture preparation instruction, and a full stroke state of the shutter button as an image capture start instruction. The system controller 107, for example, includes a CPU, a ROM and a RAM, and controls the overall operation of the image capturing apparatus as a result of the CPU executing a program stored in the ROM, using the RAM.

A lens apparatus 200 has a group of lens including a focus lens, a driving apparatus that drives the focus lens, an aperture and a mechanical shutter, and operates under the control of the system controller 107.

An image sensor 101 is a photoelectric conversion element such as a CCD image sensor or a CMOS image sensor. An analog front end (AFE) circuit 150 performs gain adjustment, A/D conversion and the like on analog image signals output from the image sensor 101, and outputs the result as digital image signals. The AFE circuit 150 will be discussed in detail later.

A buffer memory 103 temporarily stores the digital image signals output by the AFE circuit 150.

A compression/decompression circuit 104 encodes captured image data to an image file (e.g., JPEG file) format for recording, and decodes image files read from a recording medium 106.

A recording apparatus 105 performs reading and writing of data under the control of the system controller 107, with respect to a recording medium 106 such as a built-in memory or a removable memory card.

A display control circuit 108 controls a display operation with respect to a display unit 110 that includes a display device such as an LCD, under the control of the system controller 107.

A D/A converter 109 converts digital image signals for display that are output by the display control circuit 108 to analog image signals that can be displayed by the display unit 110.

The display unit 110 performs display of GUI windows for the user to configure various settings and give instructions with respect to the image capturing apparatus, and display of various types of information relating to the image capturing apparatus, and the like, as well as performing display of captured images. Also, the display unit 110 can be caused to function as an electronic viewfinder (EVF), by sequentially displaying, on the display unit 110, images captured continuously. This sequential image capture/display operation for causing the display unit 110 to function as an EVF is also called "through-the-lens view" or "live view".

A face detection circuit 120 performs a face detection process on image data in YUV format or RAW format stored in the buffer memory 103, and outputs a face detection result that includes the size and position of the face region in the image to a histogram creation circuit 130.

The face detection method used by the face detection circuit 120 is not particularly restricted, and an arbitrary known method can be applied. As for known face detection techniques, many different method have been proposed, including methods based on learning that use neural networks and the like, methods for retrieving sites with characteristic shapes such as the eyes, nose and mouth from an image using template marking, and viewing these sites as a face the higher the degree of similarity, and methods for detecting the amount of image features such as color of skin and shape of eyes, and using statistical analysis on these image features. A plurality of these methods can also be combined to improve the accuracy of face detection. Specific examples include a method of face detection using wavelet transform and the image feature amounts disclosed in Japanese Patent Laid-Open No. 2002-251380.

Here, a specific example of a face detection operation of the face detection circuit 120 will be described, with reference to FIGS. 2A to 2D, FIGS. 3A and 3B, and FIG. 4.

FIGS. 2A to 2D schematically show the process of detecting a face from an original image, with FIG. 2A showing the original image.

FIG. 3A is a flowchart illustrating a face detection operation of the face detection circuit 120.

Figure 4:
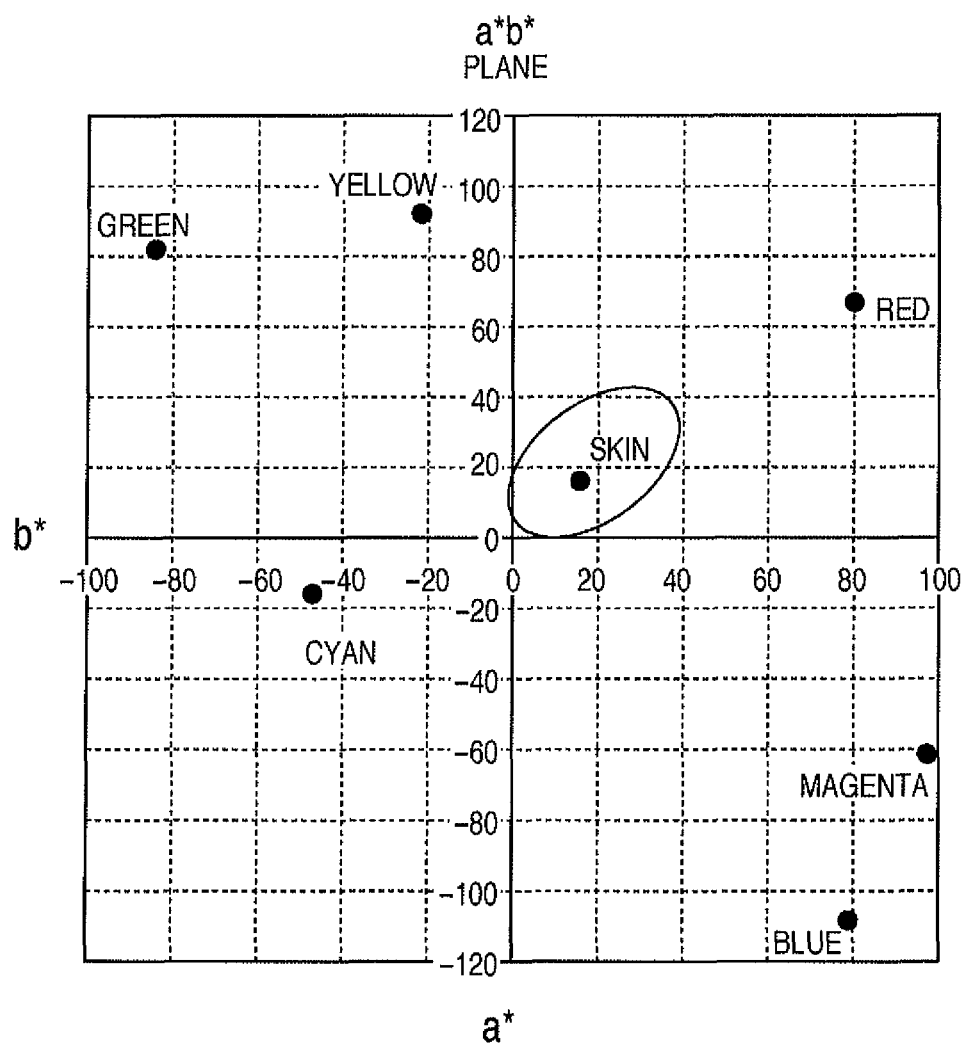
FIG. 4 is a chromaticity diagram showing representative colors in CIE L*a*b* color space.

At S101, the face detection circuit 120 extracts a skin color region from the original image. FIG. 4 is a chromaticity diagram showing representative colors in CIE L*a*b* color space, and the ellipsoid in the middle is the region most likely to be skin color.

Figure 2B:
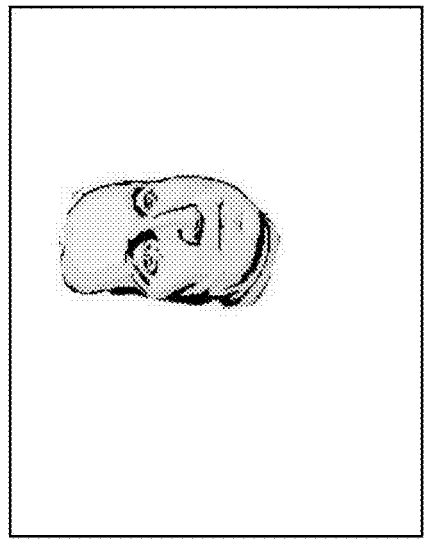

The face detection circuit 120 converts the RGB original image data to L*a*b* format with a known method, and extracts a skin color region composed of pixels having the chromaticity of the region shown by the ellipsoid in FIG. 4. FIG. 2B schematically shows the skin color region extracted from the original image.

Figure 2C:
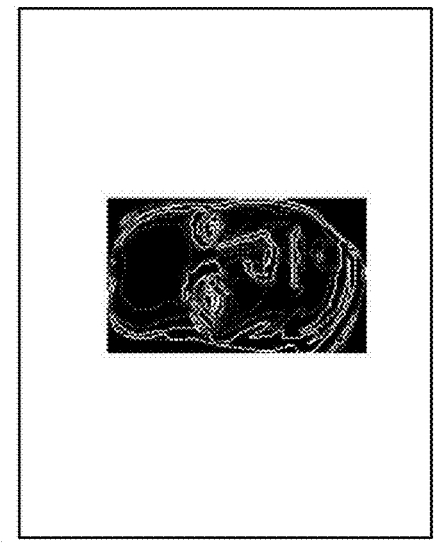

Next, at S102, the face detection circuit 120 extracts a high frequency component from the extracted skin color region. Specifically, the face detection circuit 120 applies a high-pass filter to the skin color region. FIG. 3B shows example coefficients of a two-dimensional high-pass filter. An example image obtained by applying the high-pass filter to the image in FIG. 2B is shown in FIG. 2C.

Figure 2D:
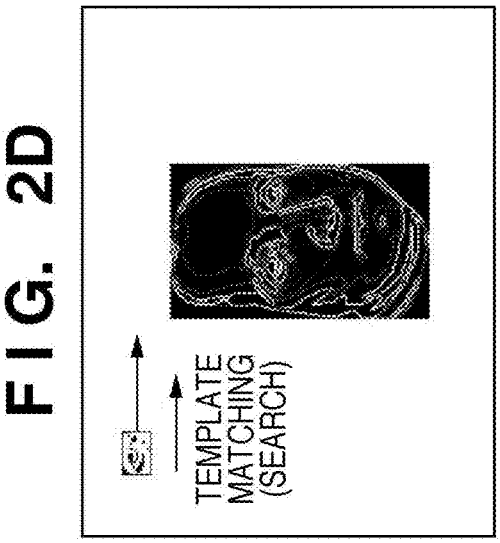

At S103, the face detection circuit 120 performs template matching on the image after application of the high-pass filter, using an eye template such as shown in FIG. 2D, and detects the eyes in the image.

At S104, the face detection circuit 120 determines the face region based on the positional relation of the eye region detected at S103, and the like, and derives a face detection result that includes the position and size of the face region.

Returning to FIG. 1, the histogram creation circuit 130 acquires the detection result of the face region from the face detection circuit 120, and creates a histogram relating to luminance values of the pixels included in the face region. The histogram creation circuit 130 can also create a histogram of the luminance values of pixels that are included, for each of a plurality of partial regions obtained by partitioning the image. Created histograms are stored in the buffer memory 103.

A signal processing circuit 140 applies signal processing to image data stored in the buffer memory 103, in accordance with signal processing parameters (white balance correction coefficients, gamma parameters, etc.) set by the system controller 107. The signal processing circuit 140 then generates YUV image data, and again stores the image data in the buffer memory 103.

As will be discussed later, the image capturing apparatus of the present embodiment realizes dynamic range enhancement, by sensitivity adjustment (gain adjustment) in the AFE circuit 150 and gamma correction in the signal processing circuit 140.

Figure 5:
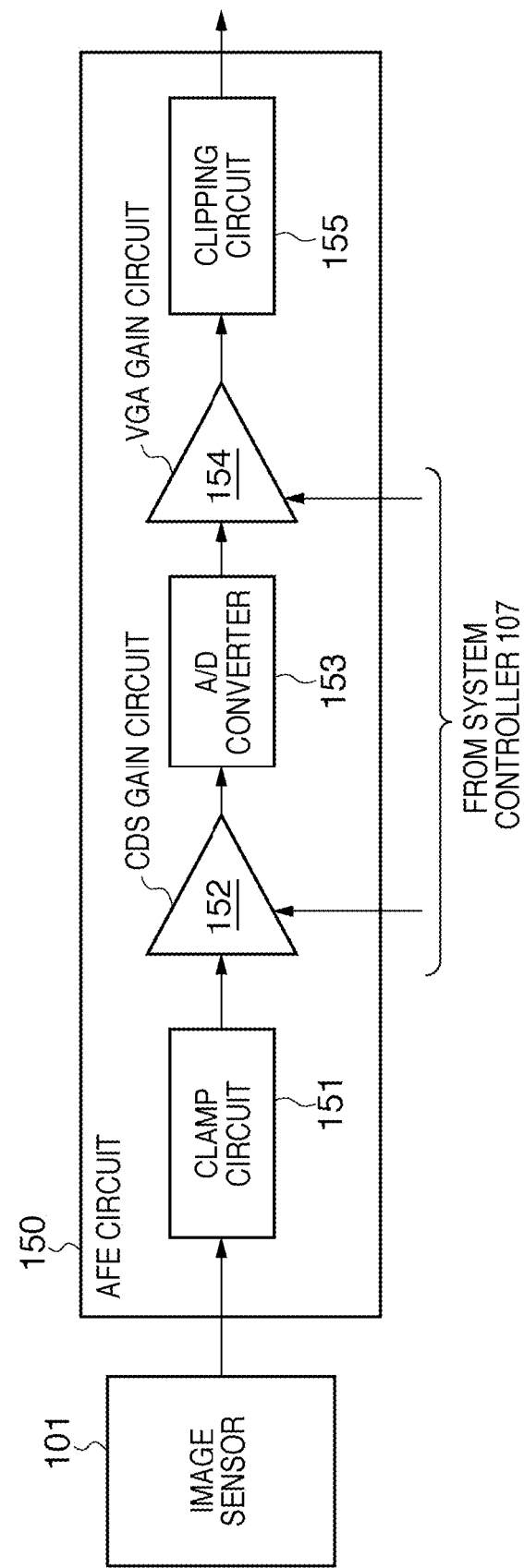
FIG. 5 is a block diagram showing an example configuration of an AFE circuit in the image capturing apparatus according to the embodiment of the present invention.

FIG. 5 is a block diagram showing an example configuration of the AFE circuit 150.

A clamp circuit 151 clamps signals output from the image sensor 101 to a reference black level, such that the output values when the sensor is blocked or the output values of a reference voltage region of the sensor will be zero.

A CDS gain circuit 152 applies a CDS gain (analog gain) to clamped signals. The CDS gain applied by a generic AFE circuit has a discrete value such as 0, 3 or 6 [dB].

Signals to which the analog gain has been applied are converted to digital data by an A/D converter 153. Next, a variable gain amplifier (VGA) gain circuit 154 applies a VGA gain to the digital data. In the present embodiment, the value of the VGA gain is adjustable in 0.125 dB increments in a range of 0 to 36 dB, for example. Signals to which the VGA gain has been applied are output to the buffer memory 103 after being clipped to a prescribed number of bits by a clipping circuit 155.

In the present embodiment, setting of ISO speed in the image capturing apparatus is realized by the system controller 107 controlling the values of the CDS gain and the VGA gain applied by the AFE circuit 150.

Also, sensitivity adjustment for correcting variability in the sensitivity characteristics of the image sensor 101 can be performed, by irradiating the image capturing apparatus with light of a reference light amount, and controlling the CDS gain and VGA gain such that a constant luminance signal value is output from the image capturing apparatus.

In the present embodiment, sensitivity setting is performed by combining the CDS gain and the VGA gain. For example, in the case where a gain of 6 dB in total is set for low sensitivity, the CDS gain is set to 3 dB and the VGA gain is set to 3 dB, for example. Also, in the case where a gain of 24 dB is set for high sensitivity, the CDS gain is set to 6 dB and the VGA gain is set to 18 dB, for example. As abovementioned, since fine setting cannot generally be performed with the CDS gain, an approximate gain is set with the upstream CDS gain, and the VGA gain is controlled in order to perform subtle sensitivity control of a sensitivity adjustment portion or the like.

Generally, a gain circuit also amplifies the noise component at the same time as the signal component. For this reason, in order to suppress amplification of the superimposed noise component with an analog circuit, the upstream CDS gain preferably is set as high as possible, in the combination of the CDS gain and the VGA gain that is able to realize the total gain amount. This setting also enables the effect of being able to effectively maximize the quantization accuracy of the A/D converter 153 to be realized.

Next, operation when image capture is performed in an image capturing apparatus having the abovementioned configuration will be described. The image capturing apparatus of the present embodiment, when operating in shooting mode in a standby state where an image capture preparation instruction or an image capture start instruction has not been input, causes the display unit 110 to function as an EVF. That is, the system controller 107 executes a process of capturing images continuously at a prescribed rate (e.g., 30 frames/sec.), generating display images from the captured images, and causing the display unit 110 to display the generated display images.

In the case where execution of face detection is set, the face detection circuit 120 performs face detection on the display images (hereafter, also referred to as EVF images), and outputs the detection results to the system controller 107. The system controller 107 then instructs the display control circuit 108 to superimpose a face frame for presenting the detected face region to the user on the EVF images, together with the position information of the face region.

The face detection results are also supplied to the histogram creation circuit 130, and the histogram creation circuit 130 creates histograms from the pixels included in the face region within the EVF images. The histogram creation circuit 130 is also able to create histograms for each of a plurality of regions into which an entire image is partitioned. Created histograms are stored in the buffer memory 103.

Figure 6:
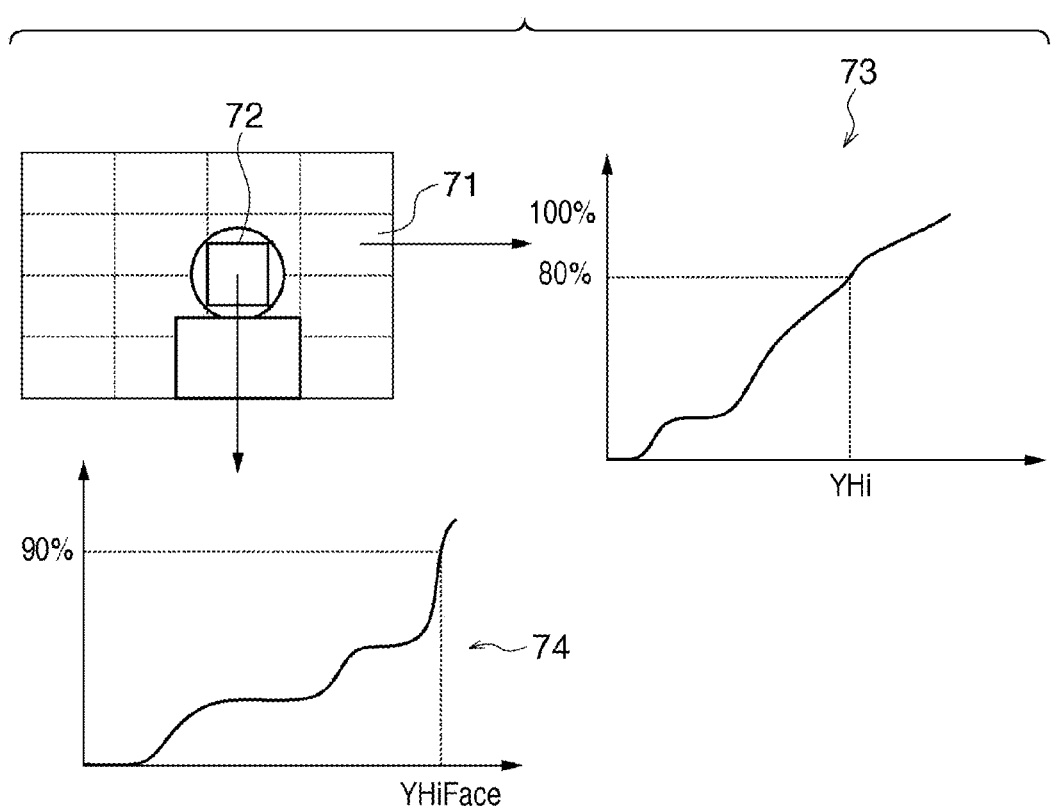
FIG. 6 schematically shows example histograms created by a histogram creation circuit of the image capturing apparatus according to the embodiment of the present invention.

FIG. 6 schematically shows example histograms created by the histogram creation circuit 130 in the present embodiment.

In FIG. 6, the creation of a histogram 73 for each partial region 71 obtained by quartering an entire image both horizontally and vertically, and a histogram 74 for a face region 72 is shown. Note that the histograms 73 and 74 in FIG. 6 are cumulative histograms. Note also that the facial region may be excluded when creating histograms for the partial regions. This enables histograms to be created for the face region and for regions other than the face region (background).

In the present embodiment, a luminance value YHi with a frequency of 80% in the cumulative histogram 73 of the partial regions 71, and a luminance value YHiFace with a frequency of 90% in the cumulative histogram 74 of the face region 72 are used in evaluating the blown-out highlights region of a captured image, such as will be discussed later.

When an image capture start instruction is input by the user pressing the shutter button to a full stroke state, the system controller 107 performs an image capture operation based on the processing results of auto exposure control (AE), auto focus detection (AF) and the like. Specifically, the system controller 107 performs image capture by controlling the focal position and aperture of the lens apparatus 200, the mechanical shutter, the image sensor 101, and, further, a flash (not shown) as required.

Analog image signals output from the image sensor 101 are stored in the buffer memory 103 as digital image data, via the abovementioned AFE circuit 150. The signal processing circuit 140 performs processing on this digital image data, in accordance with various signal processing parameters set by the system controller 107, generates YUV image data, and again stores the generated image data in the buffer memory 103.

Image data processed by the signal processing circuit 140 is encoded in a JPEG file, for example, by the compression/decompression circuit 104, and recorded to the recording medium 106 by the recording apparatus 105.

Also, the display control circuit 108 generates a display image from the YUV image data stored in the buffer memory 103, and causes the display unit 110 to display the display image as a quick review image via the D/A converter 109.

Figure 7:
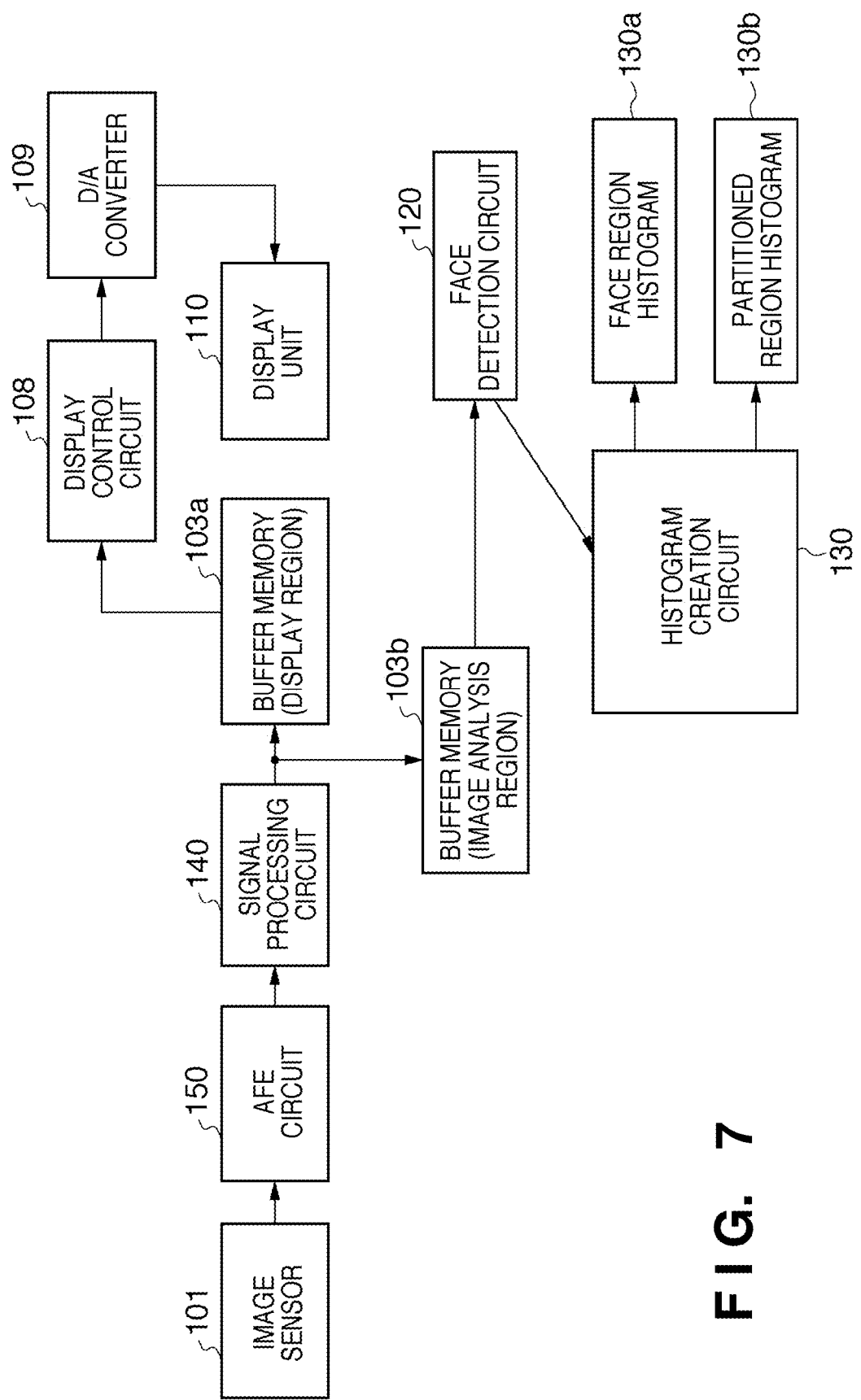
FIG. 7 is a block diagram showing the flow of signal processing in image capture standby, in the image capturing apparatus according to the embodiment of the present invention.

FIG. 7 is a block diagram showing the flow of signal processing when in image capture standby, in the image capturing apparatus according to the present embodiment. As abovementioned, when in image capture standby, the image capturing apparatus of the present embodiment performs continuous image capture and display for causing the display unit 110 to function as an EVF.

Analog image signals output from the image sensor 101 are gain adjusted (sensitivity adjusted) and digitized by the AFE circuit 150. So-called developing processes such as pixel interpolation and white balance correction are performed by the signal processing circuit 140 on this RAW image data, and YUV digital image data is generated.

This digital image data is stored in a display region (commonly called a VRAM) 103a of the buffer memory 103, and is output to the display unit 110 via the display control circuit 108 and the D/A converter 109.

On the other hand, the digital image data generated by the signal processing circuit 140 is also stored in an image analysis region (image analysis buffer) 103b of the buffer memory 103. The image data stored in the image analysis buffer 103b is used in face detection by the face detection circuit 120 and histogram creation by the histogram creation circuit 130. Note that not all of the EVF image data needs to be stored in the image analysis buffer 103b, and only the portion of EVF image data that depends on the cycle of performing face detection and histogram creation is stored.

The face detection circuit 120 performs face detection on image data stored in the image analysis buffer 103b, and if a face is detected, outputs a face detection result that includes information (e.g., position and size) that enables the face region to be specified.

The histogram creation circuit 130 creates a histogram, based on image data stored in the image analysis buffer 103b and the face detection result from the face detection circuit 120. As abovementioned, the histogram creation circuit 130 is able to create a face region histogram 130a for the face region, and a partitioned region histogram 130b for each region image obtained by partitioning the entire image.

The partitioned region histogram 130b can also be created for each region image including the face region, or derived for each region image excluding the face region, with regard to the entire image. The former is easily processed, but the latter is preferable in order to accurately detect whether the region with blown-out highlights is a face region or a background region.

As abovementioned, image capture is continuously repeated for the duration that the display unit 110 is being caused to function as an EVF, with the VRAM being quickly rewritten. Generally, the time needed for face detection and histogram creation is longer than the display cycle of EVF images (e.g., 1/30 sec.). For this reason, in the present embodiment, the image analysis buffer 103b is provided in addition to the VRAM, and the image analysis buffer 103b is not updated until face detection and histogram creation on image data stored in the image analysis buffer 103b has ended.

As a result of this configuration, it is possible to perform face detection and histogram creation on the same EVF image, and to perform image analysis easily and with a high degree of accuracy. Of course, there is no harm in executing face detection and histogram creation on each frame of the EVF images if this is possible, but there is no need to perform face detection and histogram creation on each frame, since there is generally little chance of the captured scenes changing greatly in each frame.

Figure 8:
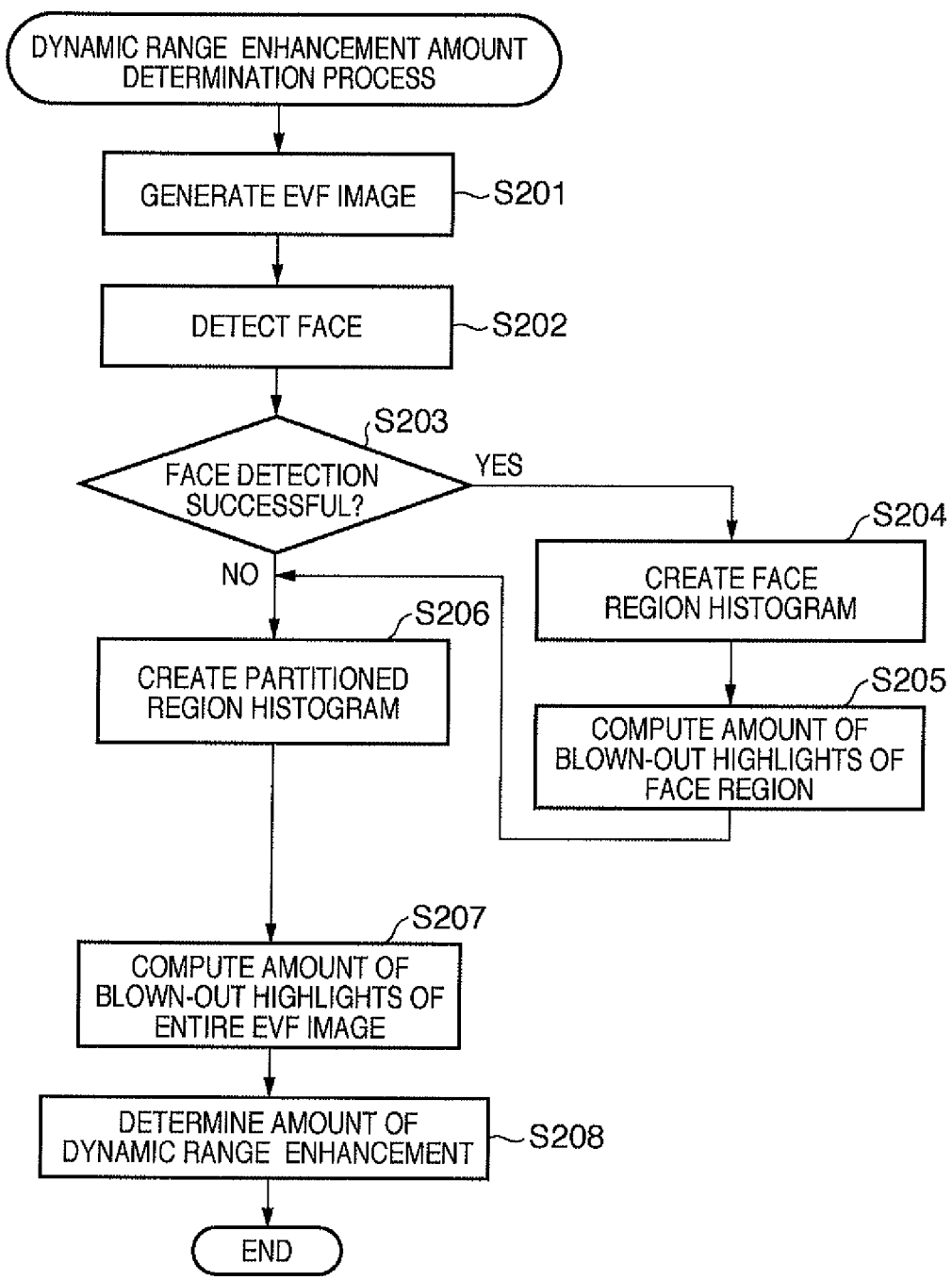
FIG. 8 is a flowchart illustrating an operation for determining an amount of dynamic range (D-range) enhancement in the image capturing apparatus according to the embodiment of the present invention.

FIG. 8 is a flowchart illustrating an operation for determining an amount of dynamic range enhancement (amount of D-range enhancement) in the image capturing apparatus of the present embodiment.

In the present embodiment, the amount of blown-out highlights in captured images is derived based on face detection results and histogram creation results with respect to EVF images, and the D-range enhancement amount is determined according to the magnitude of the amount of blown-out highlights. The exposure and sensitivity at the time of the actual image capturing process are adjusted using the amount of D-range enhancement determined in advance using EVF images.

At S201, the system controller 107, as abovementioned, continuously performs image capture, causes EVF images to be generated, and causes the EVF images to be stored in the display region 103a of the buffer memory 103 sequentially from the signal processing circuit 140. The system controller 107 also causes the EVF images to be stored in the image analysis buffer 103b of the buffer memory 103 at a predetermined cycle.

At S202, the face detection circuit 120 performs face detection on an EVF image stored in the image analysis buffer 103b.

In the case where face detection is successful (S203: YES), the histogram creation circuit 130 creates a face region histogram from the face region of the EVF image based on the face detection result from the face detection circuit 120 (S204).

At S205, the system controller 107 computes the amount of blown-out highlights of the face region, from the face region histogram.

If face detection is not successful (S203: NO), or after computation of the amount of blown-out highlights of the face region, the histogram creation circuit 130, at S206, creates a partitioned region histogram for each region image obtained by partitioning the entire EVF image.

At S207, the system controller 107 computes the amount of blown-out highlights of the entire EVF image from the partitioned region histograms.

At S208, the system controller 107 determines the amount of D-range enhancement, based on at least the amount of blown-out highlights for the entire image derived at S207.

Next, a specific example of the process of computing the amount of blown-out highlights performed by the system controller 107 at S205 and 5207 of FIG. 8 will be described. Firstly, the process of computing the amount of blown-out highlights in a face region will be described.

At S205, the system controller 107 computes, as the amount of blown-out highlights of the face region, a luminance value YHiFace at which the cumulative frequency of a cumulative histogram is a prescribed value (90% in the FIG. 6 example), from the face region histogram created at S204.

At S208, the system controller 107 then determines the amount of D-range enhancement for the face region (D+ (face)), according to the relative size relation between the value of the amount of blown-out highlights of the face region YHiFace and the predetermined threshold values.

Specifically, when the predetermined threshold values are the three steps of THHiFace, THMidFace and THLowFace in descending order, for example, the amount of D-range enhancement for the face region will be determined as follows:

$D+(\text{face}) = \text{Correction Level 1 Step (if } Y\text{HiFace} > TH\text{HiFace)}$ D+(face)=Correction Level 2/3 Steps (if
    THHiFace≥YHiFace>THMidFace)

D+(face)=Correction Level 1/3 Steps (if
    THMidFace≥YHiFace>THLowFace)

D+(face)=Correction Level 0 Steps (if
    THLowFace≥YHiFace)

Also, at S206, the system controller 107 computes the luminance value YHi_n (n=1 to several partitions; 16 in FIG. 6 example) at which the cumulative frequency of a cumulative histogram is a prescribed value (80% in FIG. 6 example), as the amount of blown-out highlights of the portion region, with regard to each partitioned region histogram created at S206.

At S207, the system controller 107 counts the number of regions YH_BNum in which the luminance value YHi_n exceeds the predetermined threshold value Y_B_Th. The system controller 107 then determines the amount of D-range enhancement for the entire image (D+(background)), according to the relative magnitude relation between the number of regions YH_BNum and predetermined threshold values.

Specifically, when the predetermined threshold values are ThYH_BNumHi, ThYH_BNumMid and ThYH_BNumLow in descending order, for example, the amount of D-range enhancement for the entire image will be determined as follows:

D+(background)=Correction Level 1 Step (if
    YH_BNum>ThYH_BNumHi)

D+(background)=Correction Level 2/3 Steps (if
    ThYH_BNumHi≥YH_BNum>ThYH_BNumMid)

D+(background)=Correction Level 1/3 Steps (if
    ThYH_BNumMid≥YH_BNum>ThYH_BNumLow)

D+(background)=Correction Level 0 Steps (if ThYH_BNumLow≥YH_BNum)

In other words, the system controller 107 determines the amount of D-range enhancement to be larger the greater the area of the blown-out highlights region in the image.

Note that the method of determining the blown-out highlights region is not limited to the method using cumulative histograms described here, and other arbitrary methods can be used.

At S208, the system controller 107 determines the final amount of D-range enhancement. Here, in the case where face detection was successful, the system controller 107 determines the final amount of D-range enhancement by comparing the amounts of D-range enhancement determined at S205 and 5207. For example, the system controller 107 is able to determine the larger amount of enhancement as the final amount of D-range enhancement, out of the amount of D-range enhancement for the face region and the amount of D-range enhancement for the entire image.

Alternatively, the system controller 107 may determine one of the amount of D-range enhancement for the face region and the amount of D-range enhancement for the entire image as the final amount of D-range enhancement according to the shooting mode set by a mode dial or the like included in the operation unit 112. For example, in the case of a shooting mode for capturing a person (e.g., portrait mode), the amount of D-range enhancement for the face region can be determined as the final amount of D-range enhancement, whereas in the case of a shooting mode for capturing landscape (e.g., landscape mode), the amount of D-range enhancement for the entire image can be determined as the final amount of D-range enhancement.

Also, the final amount of D-range enhancement can be similarly determined in the case where one of the amount of D-range enhancement for the face region and the amount of D-range enhancement for the entire image is selected according to the shooting mode selected automatically according to a scene discrimination result, rather than only according to a shooting mode set in advance with a mode dial or the like.

The final amount of D-range enhancement can also be determined according to the magnitude of the amount of D-range enhancement for the face region and the amount of D-range enhancement for the entire image, rather than only selecting one of the amount of D-range enhancement for the face region and the amount of D-range enhancement for the entire image as the final amount of D-range enhancement.

FIGS. 9A to 9C show specific examples of final amounts of D-range enhancement determined according to the magnitude of the amount of D-range enhancement for the face region and the amount of D-range enhancement for the entire image.

With the examples shown FIGS. 9A to 9C, the value of the final amount of D-range enhancement determined is changed for each shooting mode. For example, in the case where the amount of D-range enhancement for the face region is 1/3 steps, and the amount of D-range enhancement for the entire image is 0/3 steps, the final amount of D-range enhancement will be 1/3 steps in Auto mode (FIG. 9A) and portrait mode (FIG. 9C), and 0/3 steps in landscape mode (FIG. 9B).

The system controller 107 stores the amount of D-range enhancement determined as described above in the buffer memory 103, and refers to the stored amount when performing image capture. The operation of determining the amount of D-range enhancement can be performed every fixed number of frames of EVF images or every fixed period of time, for example, when in standby, and the latest amount of D-range enhancement is stored in the buffer memory 103.

Figures 10A, 10B:
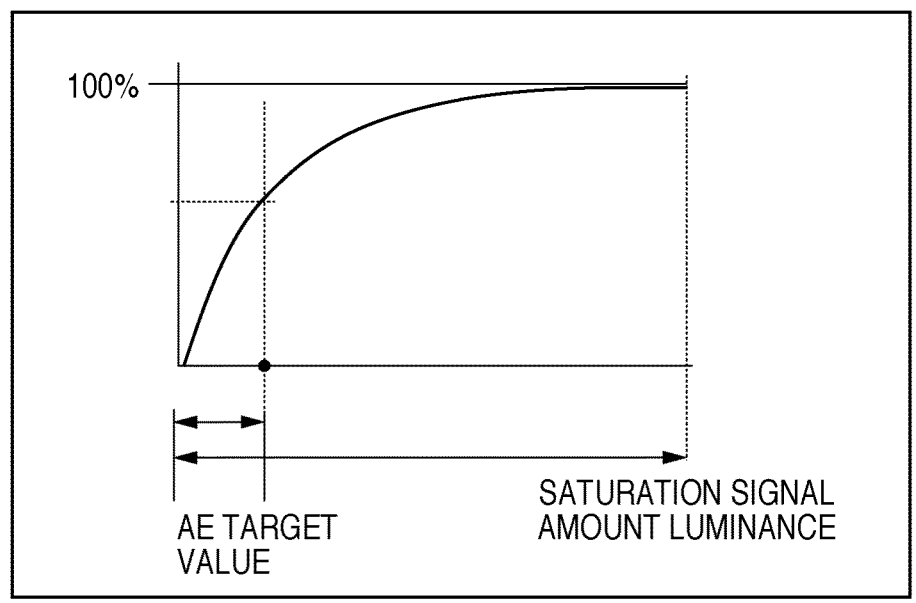
FIG. 10A represents a conceptual view of the D-range in the image capturing apparatus according to the embodiment of the present invention.
FIG. 10B shows an example relation between AE target value, saturation signal value and D-range, in the image capturing apparatus according to the embodiment of the present invention.

FIG. 10A represents a conceptual view of the D-range in the present embodiment.

In the present embodiment, the D-range is defined as the ratio of the saturation signal amount luminance of the image sensor to an appropriate luminance. An appropriate luminance is a luminance target value level for when performing automatic exposure control (AE), and is equivalent to an average value of screen brightness if the AE mode is an averaging meter mode, for example.

Accordingly, the D-range can be defined as follows:

D-range=saturation signal luminance/AE target value

Note that the AE target value here is based on an output signal from the image sensor 101 prior to sensitivity adjustment being performed in the AFE circuit 150.

The AE target value may be changed according to the AE mode, and even in the case of there being an evaluative metering mode and a spot metering mode, an AE target value for each mode can be used.

FIG. 10B shows an example relation between AE target value, saturation signal value and D-range.

It is clear from FIG. 10B that the D-range can be increased by lowering the AE target value.

Figure 11A:
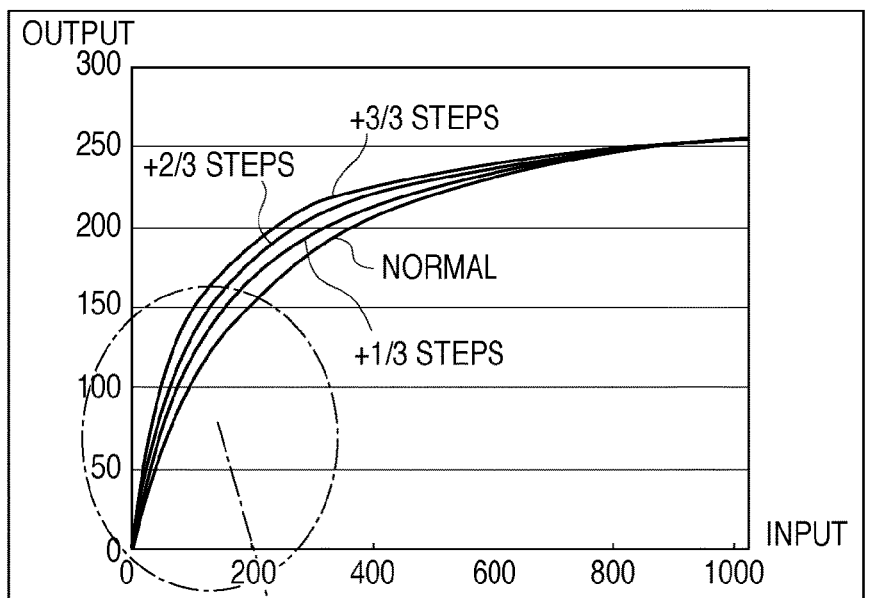
FIGS. 11A and 11B show example settings of a gamma correction characteristic in a signal processing circuit of the image capturing apparatus according to the embodiment of the present invention.
Figure 11B:
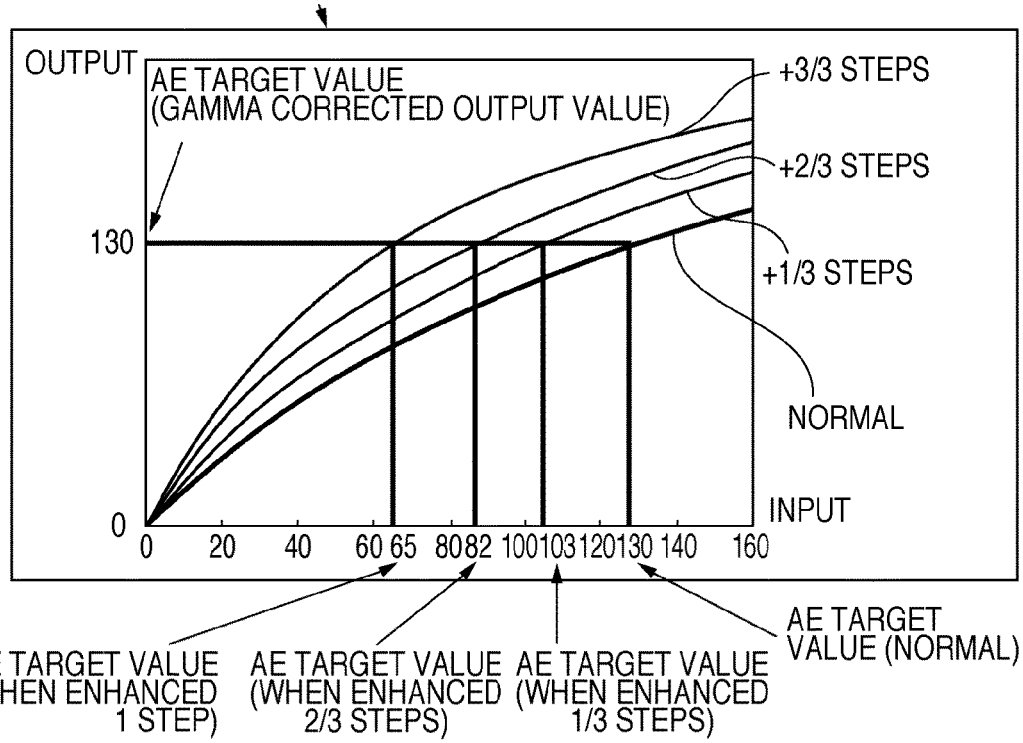

FIGS. 11A and 11B show example settings of a gamma correction characteristic in the signal processing circuit 140 of the present embodiment.

Example settings of the gamma correction characteristic (brightness correction amount) in the case where the amount of D-range enhancement is set to the four steps of normal (0/3 steps), +1/3 steps, +2/3 steps, and +3/3 steps are shown.

Here, the AE target value corresponding to the amount of D-range enhancement is the same value as that shown in FIG. 10B. As shown in FIGS. 11A and 11B, the gamma correction characteristic is set such that the AE target value after performing gamma correction on the AE target value for each D-range enhancement will be a normal AE target value at which the D-range is not enhanced, irrespective of the amount of D-range enhancement.

As described using FIG. 10A and FIG. 10B, the D-range can be enhanced by lowering the AE target value. However, simply lowering the AE target value results in underexposure and dark captured image. For this reason, the D-range can be enhanced while appropriately setting the brightness (exposure) of captured images, by performing gamma correction in the signal processing circuit 140 so as to brighten the captured image data, according to the amount of D-range enhancement.

Note that in the present embodiment, a configuration is illustrated in which a drop in the luminance of a captured image due to the AE target value being lowered is compensated by gamma correction, but similar luminance correction may be performed using different means such as a lookup table.

Also, gain such as the gain of white balance coefficients for correcting white balance, and the clipping amount for determining the saturation signal amount may be controlled. In other words, the same effect is obtained even if gain is increased by a downstream signal processing circuit, and the clipping amount is enhanced (saturation signal amount increased) by the amount of the increase in gain, after A/D conversion has been performed on an image signal whose gain has been decreased by a lessening of the amount of exposure or a lessening of the AFE gain.

Figure 12:
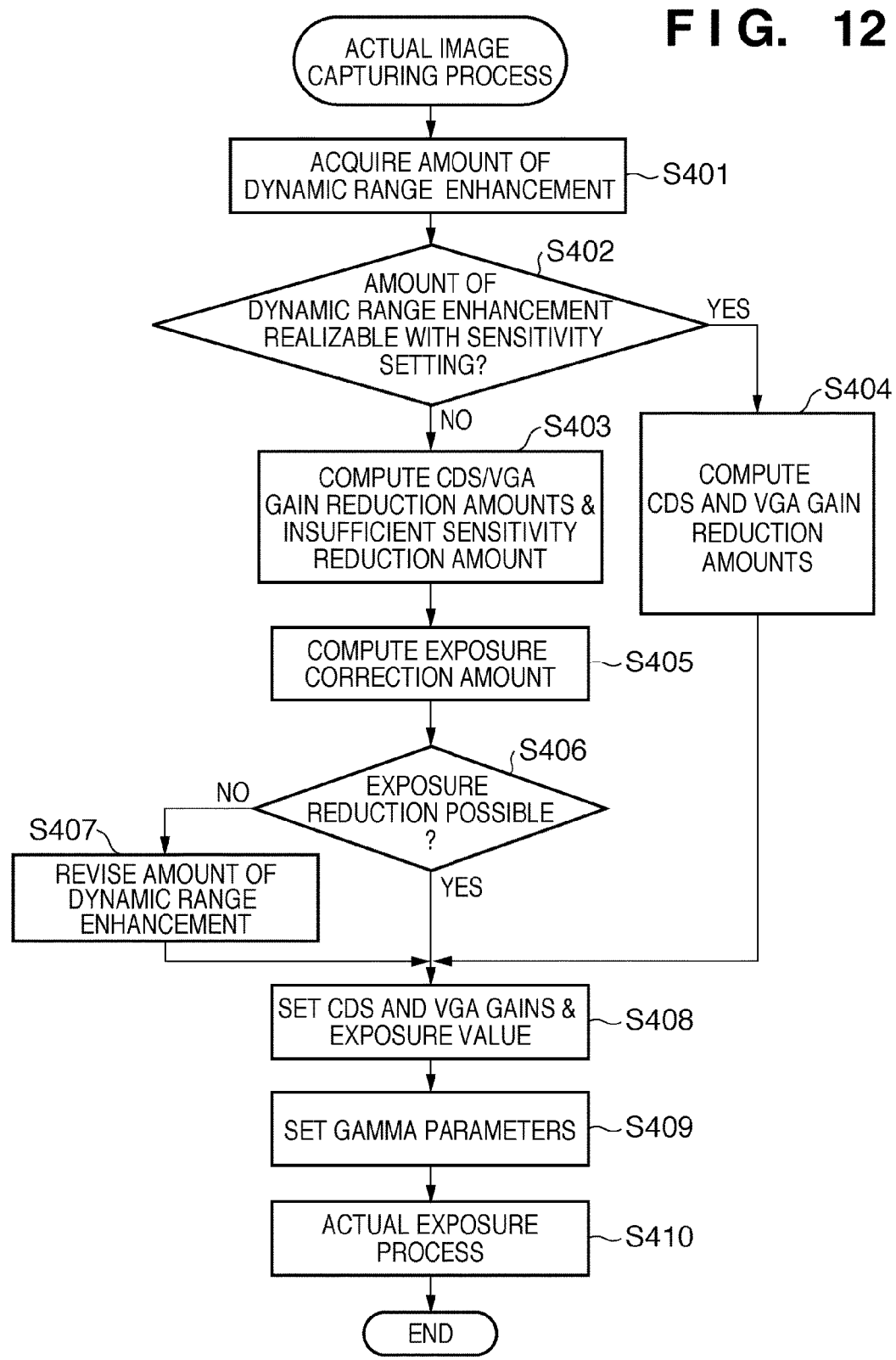
FIG. 12 is a flowchart illustrating operation of the actual image capturing process when enhancing the D-range, in the image capturing apparatus according to the embodiment of the present invention.

FIG. 12 is a flowchart illustrating operation of the actual image capturing process when enhancing the D-range, in the image capturing apparatus of the present embodiment.

Note that it is assumed that when in image capture standby, the amount of D-range enhancement is determined from EVF images at regular intervals, for example, by an abovementioned method. In the present embodiment, the amount of D-range enhancement (amount by which AE target value is lessened) can be determined with the four steps from 0/3 steps to 3/3 steps in 1/3 step increments. Note that the range and size per step of the amount of D-range enhancement can be set arbitrarily.

In response to the shutter button included in the operation unit 112 being pressed to a full stroke state and an image capture start instruction being input, when in image capture standby, the system controller 107 starts the following processing.

At S401, the system controller 107 acquires, from the buffer memory 103, the amount of D-range enhancement determined immediately before the image capture start instruction was input.

At S402, the system controller 107 determines whether the acquired amount of D-range enhancement, that is, the amount by which the AE target value is to be lessened can be realized by sensitivity adjustment in the AFE circuit 150 (control of CDS gain circuit and VGA gain circuit). This determination can be performed by comparing the range of sensitivity adjustable by the AFE circuit 150 and the amount of D-range enhancement acquired at S401. In the case where the lessening of sensitivity (lessening of gain) equivalent to the amount of D-range enhancement cannot be performed, the system controller 107 judges that the amount of D-range enhancement cannot be realized with only sensitivity adjustment by the AFE circuit 150.

In the case where the amount of D-range enhancement can be realized with sensitivity adjustment in the AFE circuit 150, the system controller 107 computes, at S404, the gain setting as an image capture condition. Note that the way in which the CDS gain and the VGA gain are combined in the setting is not particularly restricted, and setting is possible with an arbitrary combination.

On the other hand, in the case where it is judged that the amount of D-range enhancement cannot be realized with only sensitivity adjustment in the AFE circuit 150, the system controller 107 changes an exposure condition, based on the insufficient amount of gain that will remain even if available gain control is performed by the AFE circuit 150 (S405). Specifically, the system controller 107 computes the exposure correction amount for realizing the insufficient amount of gain.

Exposure correction here is minus correction, and can be realized by a common method, such as reducing the aperture, increasing the shutter speed, or inserting a neutral density filter (ND filter).

At S406, the system controller 107 determines whether exposure correction computed at S405 is possible. For example, with an image capturing apparatus that does not have a ND filter, in the case where the shutter speed has already been set to the highest setting and the aperture has been stopped all the way down (largest aperture value) by auto exposure control, minus correction of the exposure cannot be performed. Also, the shutter speed cannot be raised in the case where the highest settable shutter speed has been set, when performing flash image capture. The same applies in cases such as where the maximum shutter speed has been determined. Note that because it is preferable not to change an aperture value set by the user if in aperture priority AE mode, it may be determined that minus correction is not possible if the shutter speed is already at the highest setting. The same applies if in shutter priority AE mode.

In the case where it is determined that minus correction of exposure equivalent to the insufficient amount of gain remaining after gain adjustment is not possible, the system controller 107, at S407, revises the amount of D-range enhancement to the maximum value realizable by sensitivity adjustment and exposure correction. The system controller 107 then computes the gain amount to be set in the AFE circuit 150, and further computes the exposure correction amount as required.

At S408, the system controller 107 sets the gain amount as an image capture condition in the CDS gain circuit 152 and the VGA gain circuit 154 of the AFE circuit 150. Also, in the case of performing exposure correction, the system controller 107 changes exposure parameters that depend on the AE result (settings such as shutter speed, aperture, ND filter use) according to the amount of exposure correction, and sets the changed exposure parameters in the lens apparatus 200 as image capture conditions.

At S409, the system controller 107 sets gamma parameters that depend on the amount of D-range enhancement in the signal processing circuit 140.

At S410, the system controller 107 performs still image capture (actual exposure process).

Here, the relation between the sensitivity setting (gain setting of the AFE circuit 150) and saturation of the image sensor 101 will be described.

Generally, gain applied to the output signal of an image sensor is controlled, such that the output satisfies a prescribed relation with respect to the amount of light and the exposure value (input) of a camera.

However, the amount of charge that is storable in the photodiodes of an image sensor has an upper limit. For this reason, when the gain applied by the AFE circuit 150 is lowered with the object of lowering the ISO speed of the image sensor, the maximum signal amount after the gain has been applied also drops. Accordingly, the saturation signal amount also drops together with the drop in gain.

Thus, configuring a desired sensitivity setting is possible disregarding amplification of noise, with regard to increasing the sensitivity of the image sensor, whereas a limit value arising from the saturation signal amount exists with regard to decreasing sensitivity.

In S408 of FIG. 14, in the case where sensitivity cannot be lower, it is often the case that the minimum settable sensitivity has already been set in the image capturing apparatus. This means that the gain applied to the output signal of the image sensor has already been lessened to a value equivalent to the minimum sensitivity. For this reason, sensitivity cannot be further lessened by controlling the gain of the AFE circuit 150. Accordingly, in the present embodiment, further lessening of sensitivity is realized by exposure correction, in the case where the target lessening amount of the AE target amount value (sensitivity) cannot be realized by controlling the gain of the AFE circuit 150.

The operation for performing gamma correction in the signal processing circuit 140 to correct brightness with respect to a dark image obtained when image capture is performed at a sensitivity lessened by exposure control is ultimately the same as increasing sensitivity, and produces degradation in image quality due to noise also being amplified when performing the gamma correction.

However, in the present embodiment, in the case where lessening of ISO speed corresponding to the amount of D-range enhancement can be realized by the gain control of the AFE circuit 150, lessening the ISO speed with gain control is preferentially performed. In the case where lessening of ISO speed corresponding to the amount of D-range enhancement cannot be realized only by gain control, the gain is lessened to a minimum and the amount by which the lessening of sensitivity is deficient is made up for with exposure correction. In this case, noise itself is not significant, even if amplified when performing gamma correction, since the gain of the AFE circuit 150 has already been lessened to a level equivalent to the minimum sensitivity. For this reason, degradation in image quality can be minimized.

OTHER EMBODIMENTS

In the abovementioned embodiment, the case was described where D-range enhancement by the present invention is applied in still image capture, but can be similarly applied when performing EVF image capture and moving image capture. In this case, the timing of parameter setting is adjusted such that the gain control of the AFE circuit 150 (and exposure correction as required) and gamma correction in the signal processing circuit 140 are applied to the same image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-026694, filed on Feb. 6, 2009, and No. 2009-026695, filed on Feb. 6, 2009, which are hereby incorporated by reference herein in their entirety.

What is claimed is:

1. An image capturing apparatus comprising:
   a computing unit which computes, based on an image captured using an image sensor, an amount of blown-out highlights of the image;
   an enhancement amount determining unit which determines, based on a magnitude of the amount of blown-out highlights, an amount of dynamic range enhancement for lessening the amount of blown-out highlights;
   a correction amount determining unit which automatically determines a lessening amount of sensitivity that depends on the amount of dynamic range enhancement, and a correction amount for correcting brightness of an image captured at the lessened sensitivity, wherein the lessening amount of sensitivity increases as the amount of dynamic range enhancement increases;
   a control unit which performs image capture using the image sensor at the lessened sensitivity; and
   a correcting unit which corrects the brightness of an image captured at the lessened sensitivity, in accordance with the correction amount.

2. The image capturing apparatus according to claim 1, wherein the control unit performs image capture at the lessened sensitivity, by lessening a gain applied to a signal output from the image sensor.

3. The image capturing apparatus according to claim 1, further comprising:
   a face detecting unit which detects a face region based on the captured image,
   wherein the computing unit computes the amount of blown-out highlights respectively for the face region and the entire image, and
   the enhancement amount determining unit determines the amount of dynamic range enhancement, based on respective amounts of dynamic range enhancement for the face region and the entire image.

4. The image capturing apparatus according to claim 3, wherein the enhancement amount determining unit, in a shooting mode for capturing a person, determines the amount of dynamic range enhancement, with priority given to the amount of dynamic range enhancement for the face region over the amount of dynamic range enhancement for the entire image.

5. The image capturing apparatus according to claim 1, wherein computation of the amount of blown-out highlights by the computing unit, determination of the amount of dynamic range enhancement by the enhancement amount determining unit, and determination of the lessened sensitivity and the correction amount by the correction amount determining unit are performed based on an EVF image that is captured when in still image capture standby, and
   the control unit, in response to an image capture start instruction, performs the image capture using the lessened sensitivity and the correction amount determined immediately before input of the image capture start instruction.

6. The image capturing apparatus according to claim 1, further comprising:
   a setting unit which sets an image capture condition,
   wherein the setting unit, in a case where the lessening amount of sensitivity is realizable by lessening a gain applied to a signal output from the image sensor, sets a gain, for realizing the lessening amount of sensitivity, and in a case where the lessening amount of sensitivity is not realizable by lessening a gain applied to a signal output from the image sensor, sets a gain lessened in an available range and an exposure condition for realizing the lessening amount of sensitivity in combination with the lessened gain.

7. The image capturing apparatus according to claim 6,
wherein the setting unit, in a case where it is judged that the lessening amount of sensitivity cannot be realized by the combination of the lessened gain and the exposure condition, sets a gain and an exposure condition corresponding to a maximum realizable lessening amount of sensitivity, and revises the correction amount to a value that depends on the maximum realizable lessening amount of sensitivity.

8. The image capturing apparatus according to claim 1,
wherein the amount of blown-out highlights is represented by an area of a blown-out highlights region in the image.

9. The image capturing apparatus according to claim 8,
wherein the blown-out highlights region is a high luminance portion satisfying a predetermined condition in the image.

10. The image capturing apparatus according to claim 1,
wherein an amount of the lessening sensitivity is a difference from a reference sensitivity.

11. The image capturing apparatus according to claim 1,
wherein the correcting unit corrects the brightness of the image captured at the lessened sensitivity by gamma correction.

12. A control method of an image capturing apparatus comprising:
a computing step of computing, based on an image captured using an image sensor, an amount of blown-out highlights of the image;
an enhancement amount determining step of determining, based on a magnitude of the amount of blown-out highlights, an amount of dynamic range enhancement for lessening the amount of blown-out highlights;
a correction amount determining step of automatically determining a lessening amount of sensitivity that depends on the amount of dynamic range enhancement, and a correction amount for correcting brightness of an image captured at the lessened sensitivity, wherein the lessening mount of sensitivity increases as the amount of dynamic range enhancement increases;
a control step of performing image capture using the image sensor, at the lessened sensitivity; and
a correcting step of correcting the brightness of an image captured in the control step, in accordance with the correction amount.

13. A non-transitory computer-readable recording medium having recorded thereon a program for causing a computer of an image capturing apparatus that has an image sensor to execute the steps of the control method claimed in claim 12.

* * * * *